United States Patent
Nikolic et al.

[11] Patent Number: 5,186,837
[45] Date of Patent: Feb. 16, 1993

[54] METHOD FOR BIOLOGICAL PURIFICATION OF WASTEWATER WITH NO EXCESS SLUDGE

[75] Inventors: Ognjen Nikolić, Rijeka; Jadranka Kralj-Baretic, Kraljevica; Smiljana Koščina-Korunič, Rijeka, all of Yugoslavia

[73] Assignee: INA Rafinerija nafte rijeka n.sol.o, OOUR proizvodnja goriva i aromata sa.sub.o. druge, Kostrena-Urinj, Yugoslavia

[21] Appl. No.: 137,125

[22] Filed: Dec. 23, 1987

[30] Foreign Application Priority Data

Dec. 24, 1986 [YU] Yugoslavia ............................ 2240/86

[51] Int. Cl.$^5$ .................................................. C02F 3/02
[52] U.S. Cl. .................................. 210/614; 210/620; 210/629; 210/903
[58] Field of Search ............... 210/903, 614, 620, 628, 210/629

[56] References Cited

U.S. PATENT DOCUMENTS

| | | | |
|---|---|---|---|
| 3,980,556 | 9/1976 | Besik | 210/903 X |
| 4,537,682 | 8/1985 | Wong-Chong | 210/903 X |
| 4,643,830 | 2/1987 | Reid | 210/903 X |

Primary Examiner—Thomas Wyse
Attorney, Agent, or Firm—Pollock, Vande Sande & Priddy

[57] ABSTRACT

The present invention relates to a method and an apparatus for biological purification of wastewater with no excess activated sludge by subjecting a machanically and/or chemically pretreated wastewater to the conditions of total endogenous respiration at aeration with one or more surface turbine type aerators of $5.10^{-2}$ to $12.10^{0.2}$ kW/m$^3$ of wastewater, at a microorganism to food ratio of 20 to 100. The height of the liquid level in the basin is at least 5 m. There is provided a high-grade effluent at low capital and operational investment.

11 Claims, 5 Drawing Sheets

FIG.3e $t_1$ = optimum retention time

$t_1$=optimum retention time

METHOD FOR BIOLOGICAL PURIFICATION OF WASTEWATER WITH NO EXCESS SLUDGE

BACKGROUND OF THE INVENTION

The present invention relates to a new method concerning the environment protection, specifically to a new method for the biological purification of wastewater from domestic sewage and industrial wastewater, e.g. from chemical or oil refining plants, with no excess activated sludge. It further relates to an apparatus for the performance of said new method.

The basic principle of biological purification of wastewaters resides in the joint conversion of the dissolved organic and/or inorganic matter (substrates) into the form of sludge (activated sludge), which has to be eliminated from the system, depending upon the chosen technical solution. There exist two basic types of biological purification of sewage with regard to the characteristics of the obtained sludge:

a) the biological treatment with activated sludge, in which the sludge is removed by clarification; subsequently to the precipitation the sludge is subjected to incineration or to aerobic or anaerobic digestion;

b) the biological treatment in lagoons, where the obtained sludge exhibits dispersing instead of precipitating characteristics and requires the following elimination measures:
oxidation ponds,
mechanical operations such as filtrations through sand filters or screening systems;
all these installations are located after the basic purification lagoon.

Literature: Water and Sewage Works (1971), Reference Number, p. (R-7)–(R-14); (R-18)–(R-22); Water and Sewage Works (1964), p. 295-297; Hydrocarbon Processing, Oct. 1979, p. 99-106.

The hitherto applied principle of elimination of the (dissolved) substrate from wastewater by means of biological treatment is represented in Graph 1. It can be concluded therefrom that the substrate dissolved in wastewater is consumed by the miroorganisms in three ways, which are in mutual dynamic balance, as follows:

a) for energetic needs, responding to the reaction equation:

b) for the synthesis of new biomass (new microorganisms) in the system as represented by the equation:

c) for the so-called endogenous respiration by means of which a balanced state of the system is achieved, as represented by the equation:

Since all three above manners of consuming the substrate are in dynamic balance, the domination of any one of them depends upon the chosen conditions in the performance of the biological treatment of wastewater. The basic criterion of the domination of any of said exploitations of the dissolved substrate is the empirically assessed ratio M/F (microorganisms to food ratio), which defines the quantitative ratio of the biomass and the substrate in the system and is expressed by the following mathematical equation:

$$\frac{M}{F} = \frac{X_{v,a}V}{S_o Q}$$

wherein
M = quantity of the biomass
F = quantity of the substrate
$X_{V,a}$ = quantity of the suspended matter in the biological basin
$S_o$ = influent biological oxygen demand in 5 days
Q = flow rate of wastewater In practice, the typical M/F ratios are comprised within the values of 1-50. Depending upon their value, the biological wastewater treatments can be divided into:

M/F = 0-1 — short term aeration (highly loaded aeration)
M/F = 1-5 — conventional aeration with or without denitrification
M/F = 5-20 — extended aeration
M/F = 20-100 — lagoon In Graph 1 there is represented the exploitation of the substrate in the above-defined types of biological treatment of wastewater and it can be concluded therefrom:

The short term aeration consumes the substrate predominantly for energy needs, whereas a substantial part of the substrate remains non-degraded.

The conventional aeration with or without denitrification represents a very often applied principle of biological purification, wherein the part of the non-consumed substrate is very low (<5%), whereas the consumed substrate is substantially divided between the energy demand and the consumption for the synthesis of new biomass. The quantity of the formed sludge is essential in such a treatment because the endogenous respiration is less expressed. For this reason it is believed that the conventional aeration yields an effluent of good quality; there exists, however, the basic problem of large quantities of the of the formed sludge to be processed.

Extended aeration represents such a type of biological treatment of wastewater, wherein the endogenous respiration is the dominating feature, which is a result of the increased M/F value (M/F = 5-20) and of the reduction of the F component in this ratio. This means that the quantity of the substrate supplied to the system is lower than required for the balance of the system, which is achieved by the consumption of the cytoplasm of the neighbor biomass (the so-called "cannibalism principle"). The quality of the effluent of such a system is satisfactory, like in the previous system, the formed sludge, however, has poorer settling performances.

In the lagoon (M/F > 20) the situation is essentially different owing to the empirical fact that the activated sludge floccules only possess precipitating properties within the range of M/F = 1-2, whereas in the range of M/F > 20 they gain dispersional properties.

Figure 1:
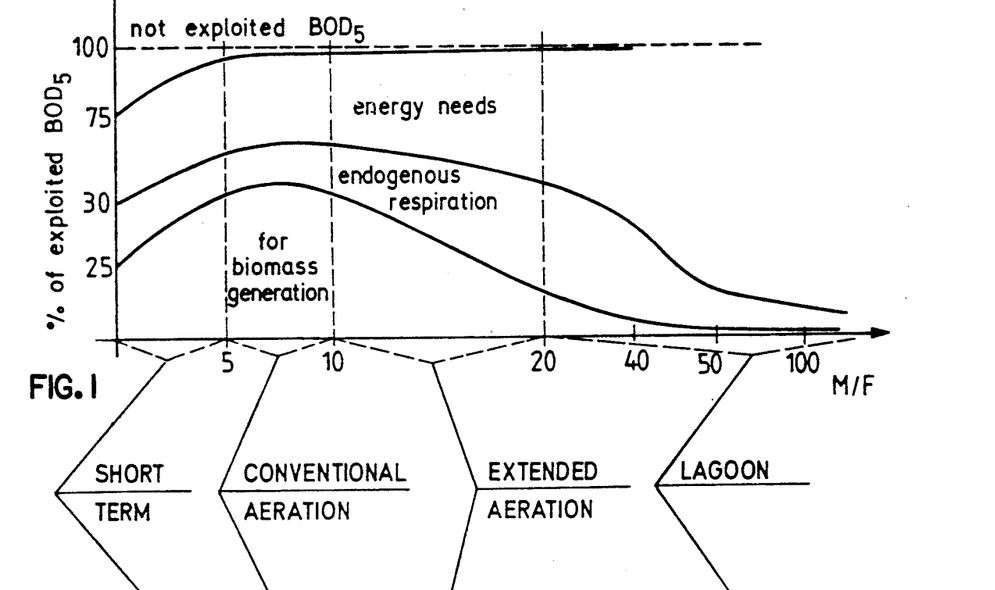
FIG. 1 is a graph of % of exploited BOD$_5$ verses M/F (microorganisms to food ratio) for various types of biological treatments.

The results are evident from Graph 2, as follows:
i) The only satisfactory effluent parameter is the concentration $(BOD_5)_{solv}$. (BOD = biological oxygen demand).

ii) The $(BOD_5)_{total}$, which is the sum of $(BOD_5)_{solv.}+(BOD_5)_{susp.}$, is approximately equal in the influent and in the effluent (or even larger in the effluent). This results from the fact that in the lagoon conditions $(BOD_5)_{solv.}$ is, during the biological consumption of the substrate, converted into $(BOD_5)_{susp.}$, which is discharged from the system by the effluent because the sludge flocks possess no precipitating but dispersing properties. Owing to obtaining a low-quality effluent, lagoons do not serve as independent facilities for the biological treatment of wastewater but are combined with facultative or similar lagoons.

iii) The share of the endogenous respiration in the lagoon is minimal and negligible, which is also one of the results of the dispersing characteristics of the sludge (graph in FIG. 1).

Oxygen Demand:

Each of the above-defined basic methods for the biological treatment of wastewater requires oxygen, which is consumed in energy yielding reactions and in endogeneous respiration reactions. The oxygen may be provided from air in molecular state (for energy needs and for endogenous respiration) or from the nitrate type compounds (for endogenous respiration).

In practice there is used the technical solution of charging air into the biological basins by means of aerators of various design. The aerators function as suppliers of oxygen (aeration of wastewater) and as stirrers of the active sludge and wastewater to keep the complete system in a suspended state, which is very important as the activated sludge in the ratio of $M/F = 1-20$ exhibits settling properties. In a lagoon of $M/F > 20$, the adjustment of the activated sludge in the suspended state is superfluous because, owing to the dispersed state of the activated sludge, it is—by virtue of its basic properties—in a suspended state.

The quantity of oxygen that has to be charged into the biological basin is divided between the air, needed for the energy demand and the air for the endogenous respiration. The quantity of air needed for the energy demand is proportional to the F value in the M/F ratio. Since the lower M/F ratio also means an increased amount of sludge in the system as well as its improved settling properties, it is evident that in this case a part of the oxygen (air) is consumed for the stabilization of the suspension state in the whole system.

In the lagoon (high M/F ratio) the amount of oxygen supply needed for the energy demand is the most reduced of all discussed embodiments for the biological purification of wastewater.

The demand of oxygen for endogenous respiration is the largest in the extensive aeration, only partially expressed in the conventional one and completely lacking in short term aeration and in lagoons, which is in accordance with the conclusions from the graph in FIG. 1.

In Table 1 there is represented the demand for oxygen and the function of oxygen in any of the cited systems for the biological purification of wastewater.

TABLE 1

Oxygen function and demand depending on the type of the biological treatment of wastewater

| Type of biological treatment | Oxygen consumption | | Relative ratio of the total oxygen consumption |
|---|---|---|---|
| | the sludge in completely mixed conditions | for energy needs | for endogenous respiration | |

TABLE 1-continued

| | | | | |
|---|---|---|---|---|
| short term | ◐ | ◑ | ○ | 0.9 |
| conventional | ◕ | ◐ | ◕ | 1.0 |
| extended | ◉ | ◑ | ◐ | 1.2 |
| lagoon | ○ | ● | ○ | 0.2 |

● maximum consumption
◑ ⅔ of the total consumption
◕ ½ of the total consumption
◉ ⅓ of the total consumption
○ without consumption For the aeration of biological basins the following types of aerators are used in practice:
diffusion type
surface turbine type
surface propeller type
submersed turbine type In Table 2 there are presented the types of aerators depending on the type of the biological treatment of wastewater.

TABLE 2

Types of aerators depending on the type of the biological treatment of wastewater

| Type of biological treatment | Type of aerator | | | |
|---|---|---|---|---|
| | diffusion | surface turbine type | surface propeller type | submersed turbine type |
| short term | x | x | | |
| conventional | x | x | | x |
| extended | x | x | | |
| lagoon | | x | x | |

The criteria in the selection of the aerator type are more of an empirical than of theoretical nature. Since the aeration of biological basins is an essential economic parameter in the biological treatment of wastewater, the design of said systems always takes into account that the amount of the charged oxygen should be equal to or in a slight excess over the theoretically needed one. The oxygen demand (kg $O_2$/h) for each type of biological treatment can be calculated from the ratio of the endogenous and the energetic respiration. The selection of the type of the aerators and the number thereof can be assessed on the basis of the empirical parameter of the type "oxygen transfer efficiency" (EPK), which represents the ratio of the oxygen transferred from the aerator to the flocks of the activated sludge and the total supply of oxygen, expressed in a percentage ratio.

The EPK value depends on:
a) the type of the biological basin
  the type of the aerator (Tables 2, 3)
  the design of the biological basin
  the ratio of the aerator power/volume of the biological basin
b) the characteristics of the wastewater subjected to purification:
  the temperature of the water
  the biological loading of wastewater
  the concentration of biomass in the system
  the surface action of the wastewater It has been shown in practice that a high "EPK" is achieved when the following criteria are fulfilled:
The selection of the aerator should comply with the data of the following Table 3.

In the design of the biological basins the depth of the basin is not an essential parameter for surface aerators (provided the mixing is complete and the biomass is kept in suspension - Table 3), whereas the surface of the basin is an essential parameter; in submersed aerators it is just the contrary. When using surface aerators, the surface of the basin should be round (if there is only one provided) or square if there are several of them. When using diffusion aerators, the surface should be in the form of an elongated rectangle (the volume should be in the form of a channel).

The ratio between the aerator power and the basin volume should at minimum fulfill the data of the following Table 4, otherwise the system is not in suspension at all.

TABLE 3

Types of aerators depending on the "EPK" parameter and the possibility of keeping the activated sludge in suspension

| Type of aerator | "EPK" parameter | Keeping the active sludge in completely mixed conditions |
|---|---|---|
| diffusion | 0.7-1.8 | good (regardless of the depth) |
| surface turbine type | 1.8-2.4 | 0.3-5 m good >5 m bad |
| surface propeller type | 1.8 | 1-6 m good |
| submersed turbine type | 1.2-1.8 | good (regardless of the depth) |

TABLE 4

Ratio of the aerator power/volume of the biological basin

| Type of biological treatment | Aerator power (kW/m$^3$) |
|---|---|
| short term | $2.5 \cdot 10^{-2}$ |
| conventional aeration | $2.5 \cdot 10^{-2}$ |
| extended aeration | $2.5 \cdot 10^{-2}$ |
| lagoon | $1.5 \cdot 10^{-2}$ |

The temperature of the wastewater ought to influence the "EPK" value, taking into account that the solubility and distribution of oxygen are different at different temperatures. Since, however, the wastewater is always aerated in a minimum excess of 20% over the value proportional to the loading and the supplied oxygen is immediately spent for the biodegradation of the substrate, the effect of the temperature is practically only important in low loaded wastewaters because aerators of lower power are used in such conditions.

The "EPK" parameters do not differ if there are various amounts of the biomass in the biological basin; a different amount of biomass in the same biological basin, however, means an increased oxygen demand because a larger amount of biomass always means an intensified endogenous respiration.

If there are surfactants present in the wastewater (detergents), there occurs a sharp drop of the "EPK" value which can drop to the zero value, provided that an increased concentration of the surfactants and the use of surface aerators are involved.

The aeration of wastewater in the biological treatment thereof represents an essential economical parameter of each such system, therefore in practice, the aeration is performed in such a manner that the minimum possible energy is consumed and, simultaneously, the criterion of keeping the active sludge suspended in water is fulfilled and the value of the "EPK" parameter is maintained as high as possible.

Examples for energy savings in the performance of aeration depending on the type of biological treatment are given in the following Table·5. It represents the relationships between the input energy and the unit volume of the basin and between the input energy and the unit volume of the biological loading of the wastewater.

TABLE 5

The relationship between the aerator power and the unit volume of the biological basin and the unit loading for the basic types of biological wastewater treatments

| Type of biological treatment | Power of the aerator per | |
|---|---|---|
| | volume of the biological basin (kW/m$^3$) | biological loading unit (kW/kg BOD$_5$) |
| short term | $6.10^{-2}$–$8.10^{-2}$ | 0.17–0.66 |
| conventional | $4.10^{-2}$–$6.10^{-2}$ | 0.66–1.01 |
| extended | $2.10^{-2}$–$4.10^{-2}$ | 1.01–1.06 |
| lagoon | $1.10^{-2}$–$2.10^{-2}$ | 1.06 |

The nutrient question:

The biological treatments of wastewater exploit the nutrients of the nitrogen (N) and phosphorus (P) types for the following:

the energy needs (N), the endogenous respiration (N, P), the generation of new biomass (N, P).

In the technique of wastewater treatment it has been established that the nutrients ought to fulfill the following relationship:

$$BOD_5: N: P = 100: (5-10): (0.5-1.5)$$

The consumption of nitrogen and phosphorus, however, also depends on the type of the biological treatment.

The nutrients on the basis of nitrogen may be organic nitrogen compounds, ammonia, urea etc., and nitrates, the phosphorus compounds are preferably on the basis of orthophosphates.

In all methods of biological wastewater treatment with excess activated sludge, after attaining the basic balance between the substrate and the nutrient, there should be added such an amount of the nutrient that it corresponds to the amount discharged by the excess sludge or, in a lagoon, to the amount of nutrients discharged in the form of $(BOD_5)_{tot}$ owing to the dispersion properties of the sludge. The function of phosphorus is very simple (it is only incorporated into the new biomass), whereas the function of nitrogen depends upon the dominating structure of the nitrogen compounds and the type of the chosen biological treatment, since according to the selected way of biological treatment nitrogen can be converted from one chemical form into another and leave the system by way of the effluent in various chemical forms.

In the following scheme there is represented the possible conversion pathway of nitrogen compounds regardless of the type of the biological treatment, and FIG. 3 indicates the principles of the conversion of nitrogen compounds depending upon the type of the biological treatment.

BASIC CONVERSION PATHWAY FOR NITROGEN (N)
IN WASTEWATER TREATMENTS

NITROGEN GAS — $N_2$

From the graphs a) - e) of FIG. 3 it can be concluded that:
  a) In short term aeration, in addition to the discharge with the excess sludge, a part of the nitrogen is also lost via the effluent as a nitrate and the slightly increased amount of suspended matter which comprises the nitrogen in the form of aminoacids (protein).
  b) In the conventional aeration without denitrification a part of nitrogen is also lost via the effluent in the form of nitrates in addition to the excess sludge; the loss via the suspended matter in the effluent, however, is minimal.
  c) In the conventional aeration with denitrification there occurs the lowest content of nitrogen in the effluent of all described biological principles of wastewater purification, which is a result of the denitrification of nitrogen from the nitrate into the gaseous nitrogen ($N_2$), which leaves the basin at the surface. This, however, does not mean that the consumption of nitrogen is not equal to the amount consumed in the conventional aeration without denitrification.
  d) In the extensive aeration the nitrogen is lost via the effluent in the form of nitrate and in the form of aminoacids (proteins) owing to the slightly increased concentration of the suspended matter in the effluent. The amount of the nitrate in the effluent in the extensive aeration may be such that the pH value of the effluent drops within the acidic range.
  e) Lagoons yield sludge of dispersing properties, accordingly they lose the predominant part of the nitrogen in the effluent in the form of suspended matter (aminoacids and proteins) and the residue in the form of nitrates.

In connection with the nutrient and especially the nitrogen problem it can be concluded that in all discussed types of biological wastewater treatments there should be achieved the basic balance for the degradation of the substrate by means of dosing nitrogen in any possible way into the influent if the latter does not contain sufficient amounts of nitrogen, e.g. in household sewage. The added amount of the supplied nitrogen should be approximately equal (economically) to the energy demand for the aeration of the biological basins.

The influence of the quantity of biomass in the system:

The various types of the biological wastewater treatments demand the provision of different amounts of the biomass in the biological basin and the clarifier and the discharge of different amounts of the excess biomass from the system. In practice the most often encountered parameter indicating the concentration of the biomass in the system is the so-called "mix liquor volatile suspended solids" concentration (MLVSS), which amounts to 70-80% of the total suspended matter in well-monitored systems.

In Table 6 there are presented the conventional concentrations of the MLVSS parameter in various types of biological treatments.

TABLE 6

Concentrations of MLVSS depending on the type of biological treatment

| Type of biological treatment | MLVSS concentration (mg/l) | | |
|---|---|---|---|
| | in the biological basin | in the clarifier | in the effluent |
| short term | 1500–2500 | 8000–10000 | 100 |
| conventional | 2500–3500 | 10000–12000 | 20 |
| extended | 3500–5000 | >12000 | 40 |
| lagoon | 400–800 | without clarifier | 400–800 |

As stated above, the different MLVSS do not simultaneously mean a different oxygen demand (the consumption of oxygen is proportional to the biological loading and the intensity of endogenous repiration and only indirectly depends upon the biomass amount in the system). Yet since a part of the MLVSS concentration represents the excess sludge, which has to be subsequently processed, in practice the biological treatment should be performed, as a rule, with the aim to minimize the excess sludge.

The amount of excess sludge depending upon the type of biological treatment is represented in Table 7. It is evident therefrom that the excess sludge is maximal at biological methods characterized by a lower M/F value, which means that these methods involve higher costs for the processing of the excess sludge.

TABLE 7

The amount of excess sludge depending on the biological treatment

| Type of biological treatment | Amount of excess sludge |
|---|---|
| short term | 20–40 m³/day |
| conventional aeration | 5–20 m³/day |
| extended aeration | 0.2–5 m³/day |
| lagoon | the sludge is dispersed, the effluent contains excess sludge |

The problem of excess sludge can be conventionally solved in one of the following manners:
  direct disposal
  disposal subsequently to solidification
  aerobic digestion
  anaerobic digestion
  incineration The direct disposal is, in fact, not a form of excess sludge processing and is being abandoned because of the toxic components of the sludge.

The disposal subsequently to solidification is feasible in some cases of wastewaters, e.g. in the wastewater of food processing, it cannot, however, be considered as a general principle for excess sludge processing.

The aerobic digestion represents a form of excess sludge processing, wherein the organic part of the sludge is oxidized with oxygen into carbon dioxide; owing to the energy consumption required for the aeration, it involves additional costs for the wastewater treatment plants.

The anaerobic digestion represents a form of excess sludge processing, wherein the organic part of the sludge is, in the absence of oxygen, reduced to methane, which can be exploited as an energy source in the wastewater treatment plants with the provision that there is a considerable amount of sludge. From the viewpoint of capital investment, the costs of anaerobic digestion exceed those of the aerobic digestion.

The incineration of sludges represents the most expensive type of excess sludge processing, yet it is the best way from the technological-technical point of view because it yields ash consisting of inert components.

The comparison of the main prior art processings for excess sludge disposal depending upon the capital investment and operation costs is represented in the Table 7. It is evident therefrom that the investment in such an arrangement may attain depending upon the selected type —40-60% of the capital investment, whereas the operating costs may attain 30-40% of the total operating costs; therefore it is understandable that the excess sludge is desired to be minimized. It has to be mentioned that in practice quite often no department for sludge processing is foreseen in wastewater treatment plants owing to the lack of investment capital.

TABLE 8

The comparison of the investment and operating costs in the excess sludge processing

| Type of excess sludge processing | Capital investment for excess sludge treatment (total = 100%) | Operational costs (total = 100%) |
|---|---|---|
| aerobic digestion | 40% | 40% |
| anaerobic digestion | 50% | 30% |
| incineration | 50-60% | 40% |

Microorganisms involved in the biological wastewater treatment pertain to a heteropopulation comprising the following genera: Pseudomonas, Achromobacter, Micrococcus, Bacillus, Alcaligenes, Escherichia, Flavobacterium, Nocardia, Zoogloea, and Serratia.

SUMMARY OF THE INVENTION

The present invention relates to a new method and an apparatus for biological purification of wastewater, wherein the resulting improvement resides in the absence of excess sludge and in the high quality of the effluent even at high loaded influents, e.g. in the conditions of high pH values, "phenol shocks" etc. In particular the present invention relates to the biological purification of wastewater containing substantially no toxic and/or inhibiting substances for the microorganisms, which is charged into a purification basin, wherein the level of said wastewater is at least 5 m over the bottom of said basin, and said wastewater is under the conditions of totally endogeneous respiration aerated with a surface turbine type aerator of $5.10^{-2}$ to $12.10^{-2}$ kW/m$^3$ of wastewater, at a microorganism to food ratio of 20 to 100.

The present invention yields a high-grade effluent and the lowest possible amount of excess sludge at a low energy (oxygen) and nutrient (N, P) input, with the provision that the following requirements are fulfilled:

the M/F (microorganism to food) ratio is adjusted within the range of 20-100, characteristic of the sludge of dispersing properties;

the excess sludge generated in the biodegradation of the substrate is inhibited to leave the biological basin by the exclusive use of surface turbine type aerators of a power of $5.10^{-2}$ to $12.10^{-2}$ kW/m$^3$ of the basin;

the level of the treated charge in the basin must be at least 5 m from the bottom of the basin; this feature is essential because the total mixing of the charge/activated sludge is impeded.

Figure 2:
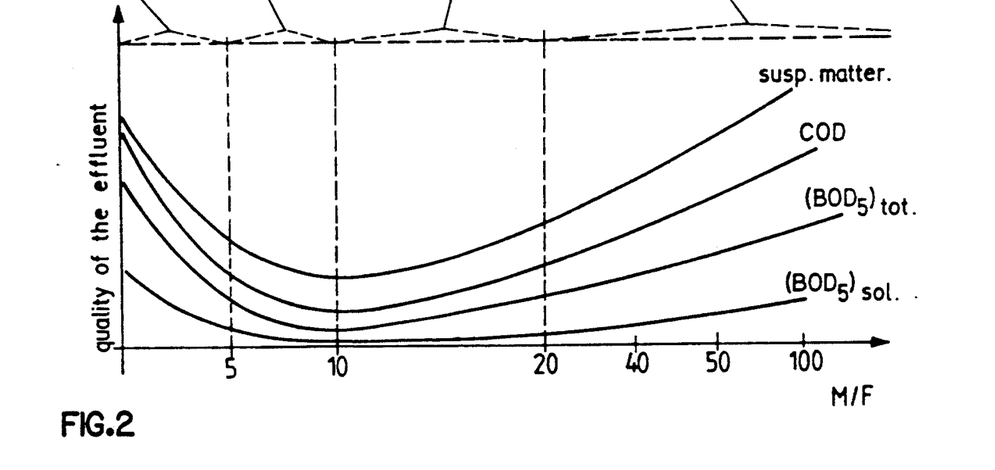
FIG. 2 is a graph of quality of effluent verses M/F for various types of biological treatments.
Figure 3A:
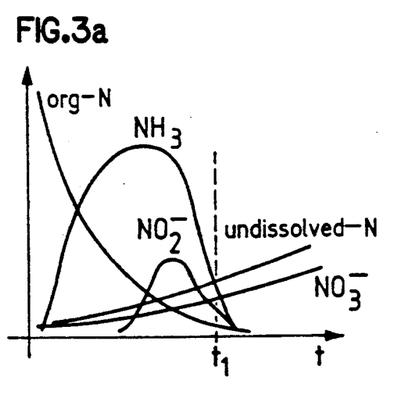
FIGS. 3a-3e illustrate the principles of conversion of nitrogen compounds depending upon the type of biological treatment.
Figure 3B:
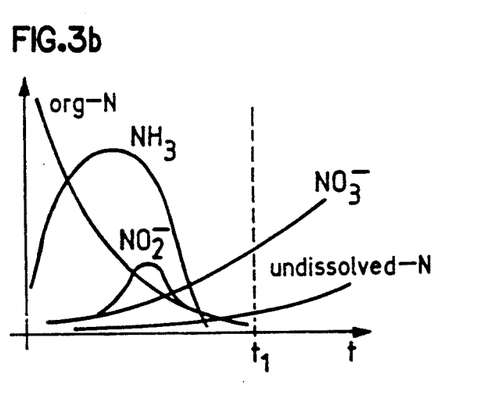
Figure 3C:
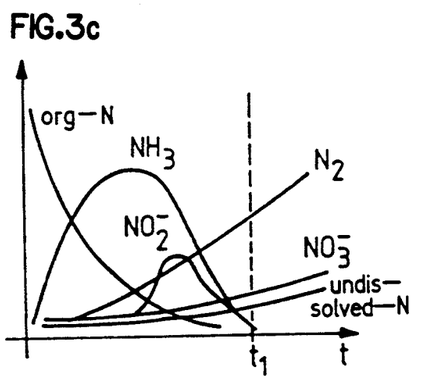
Figure 3D:
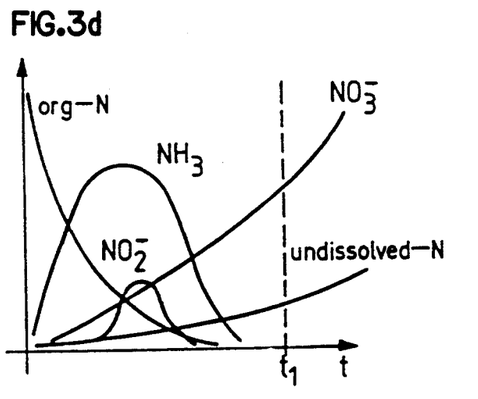
Figure 3E:
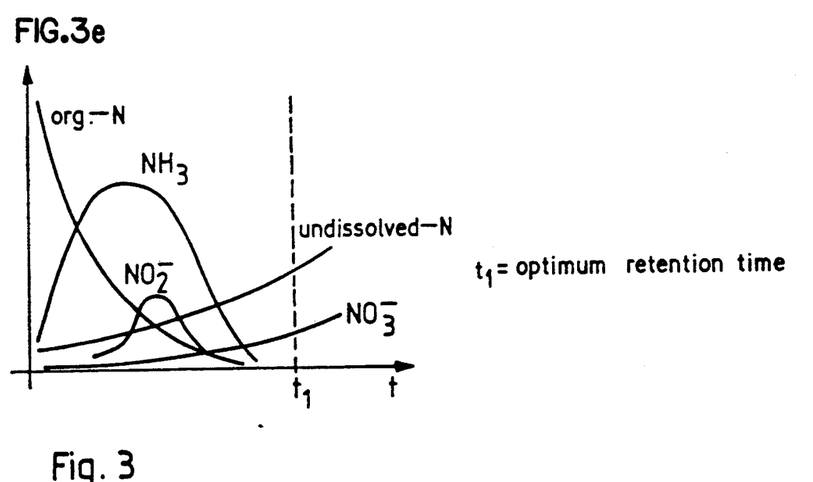
Figure 4:
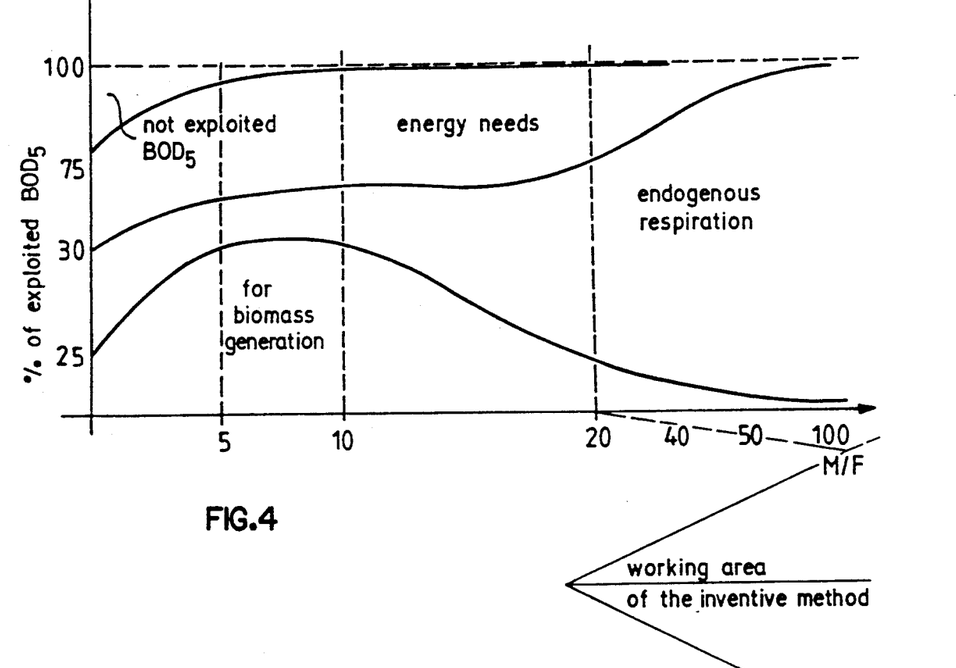
FIG. 4 is a graph of % of exploited BOD$_5$ verses M/F pursuant to the present invention.
Figure 5:
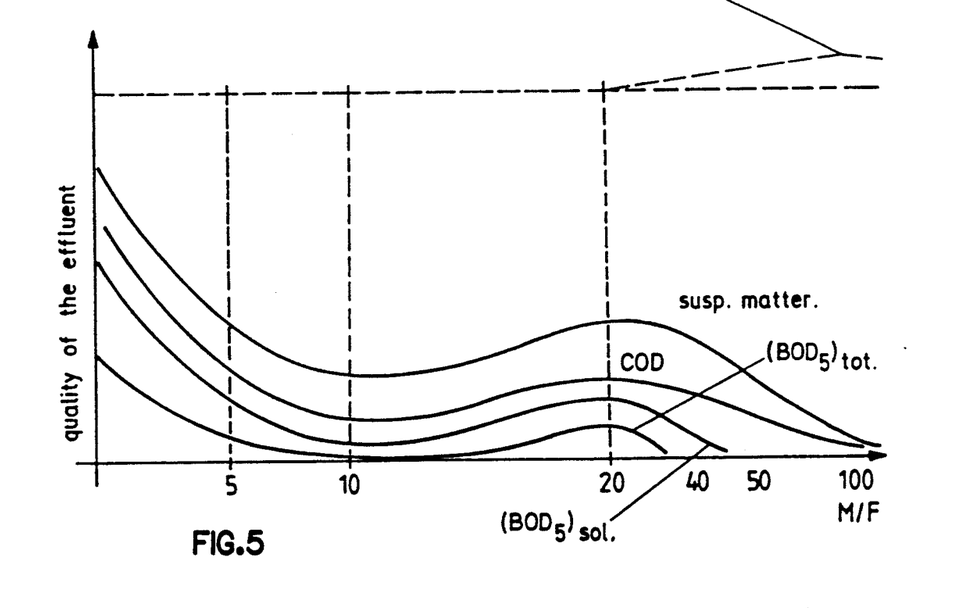
FIG. 5 is a graph of quality of effluent versus M/F pursuant to the present invention.

The above-defined requirements of performing the biological wastewater treatment, in the presence of the afore-defined conventional microorganisms, result in the following new reaction conditions:

1. The inhibition of the discharge of the sludge from the basin makes possible the total endogenous respiration, which consumes the substrate in the manner indicated in the graph in FIG. 4. The comparison of the graph in FIG. 1 with the graph in FIG. 4 shows that the technical solution inhibiting the discharge of the excess or of the total amount resp. of the activated sludge from the system results in the consumption of the substrate primarily for endogenous respiration and not for energy needs. The change in the function of the consumption of the substrate yields a modification of the effluent quality as it is evident from the graph in FIG. 5 in comparison with the graph in FIG. 2.

2. Contrary to the functions of oxygen in the cited prior art methods, the present invention uses oxygen in a different manner and for different needs as for those indicated in Table 1. The following Table 9 represents the oxygen (air) consumption in the present inventive method and it is evident therefrom that the oxygen is predominantly consumed for endogenous respiration and only secondarily for energy needs. It additionally serves for the novel function of pressing or pushing the sludge downwards—to the bottom of the biological basin; there, however, oxygen is not needed any more for holding the sludge in completely mixed conditions since this is achieved by the selected M/F ratio.

TABLE 9

| | Oxygen function and demand in the claimed method | | | | Relative ratio of the total oxygen consumption |
|---|---|---|---|---|---|
| | Oxygen consumption | | | | |
| Type of biological treatment | the sludge is in completely mixed conditions | for endogeneous respiration | for energy needs | for pressing the sludge towards the bottom of the basin | |
| Biological purification in accordance with the present invention with no excess sludge | ○ | ◐ | ◓ | ◕ | 1.4 |

The oxygen consumption exceeds that of prior art processes as the air containing oxygen is used for the new function of pressing the sludge towards the bottom of the biological basin, impeding its rise.

3. The present invention is strictly limited to such a performance of biological purification, wherein a complete mixing (stirring) of the treated wastewater is excluded; it is suggested to apply surface turbine type aerators on purification basins where the depth of the treated wastewater exceeds 5 m. The "EPK" value is minimally expressed for surface turbine type aerators (approx. 1.8 kg/kWh); this is, however, not essential as the minimal "EPK" value for the surface turbine type aerator still corresponds to the maximal "EPK" value for other types of aerators (Table 3).

4. The ratio of the aerator power and the volume of the biological purification basin and the biological loading resp. exceeds the corresponding ratio in the prior art processes (kW/m$^3$=5-12.10$^{-2}$ and kW/kg BOD$_5$=0-.2-0.6 resp.), which is the indirect result of the additional energy demand for holding the sludge at the bottom of the basin by exercising an air pressure thereto.

5. In the conditions of total endogenous respiration the whole consumed nitrogen is converted into ammonia, which is, in turn, consumed in oxidizing reactions of the substrate as represented in the following equations 1 and 2:

organic-N + 5O$_2$ ⇌ 5CO$_2$ + 2H$_2$O + NH$_3$     (1)

substrate + O$_2$ + NH$_3$ ⇌ CO$_2$ + H$_2$O + organic-N     (2)

By summing up the reactions the following equation is obtained:

substrate + 6O$_2$ ⇌ 6CO$_2$ + 3H$_2$O     (3)

It can be concluded that the present inventive method characterized by the total endogenous respiration is performed without any supply of nitrogen since the total-amount of nitrogen in the system is self-controlled.

Figure 6:
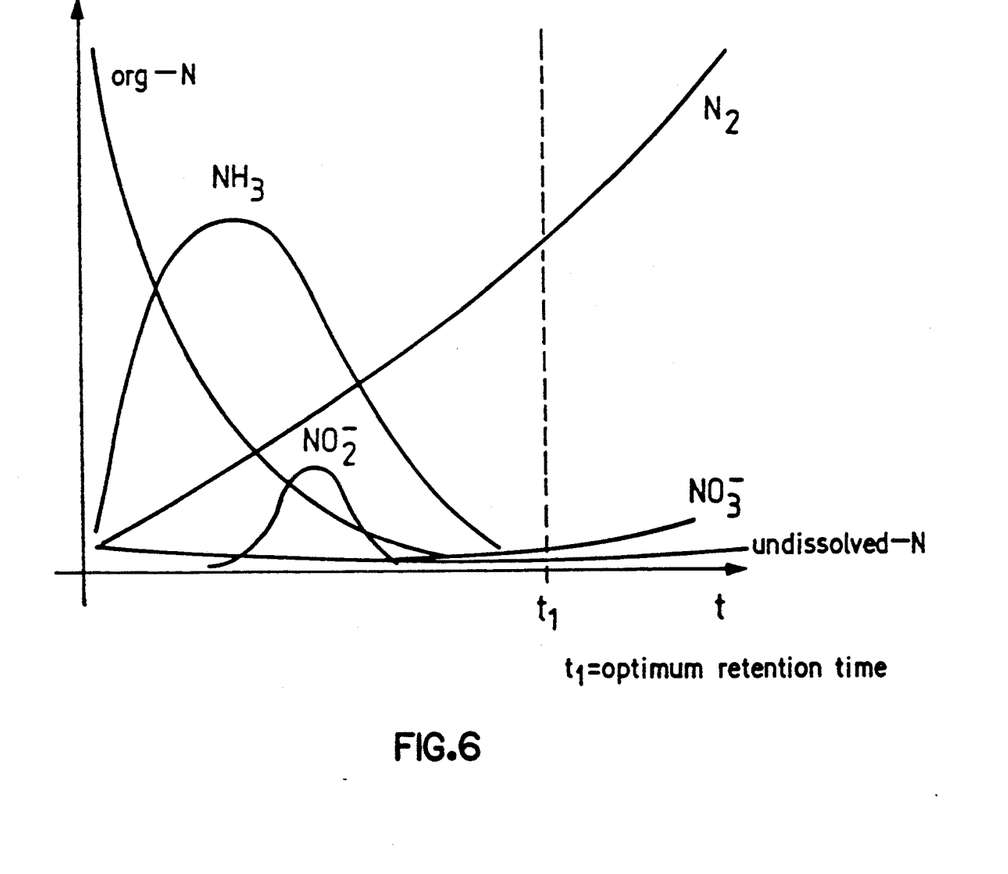
FIG. 6 is a graph showing effluent achieved pursuant to the present invention.

If however, the system contains an excess of nitrogen there will be formed an excess of ammonia, which will in turn be converted into a nitrate. Under the conditions of total endogenous respiration the nitrate will react instead of oxygen in the oxidation of the substrate as follows:

NO$_3^-$ + substrate ⇌ CO$_2$ + N$_2$     (4)

and the resulting gaseous N$_2$ will escape from the system. Accordingly, the resulting effluent will contain (substantially) no nitrates as represented by the graph in FIG. 6.

6. Because of the total endogenous respiration the quantity of the biomass in the system (MLVSS) amounts to 50-100 mg/l and in the effluent (MLVSS)$_{ef}$ to 10-20 mg/l, which is lower than in prior art purification treatments as shown in Table 6.

Figure 7:
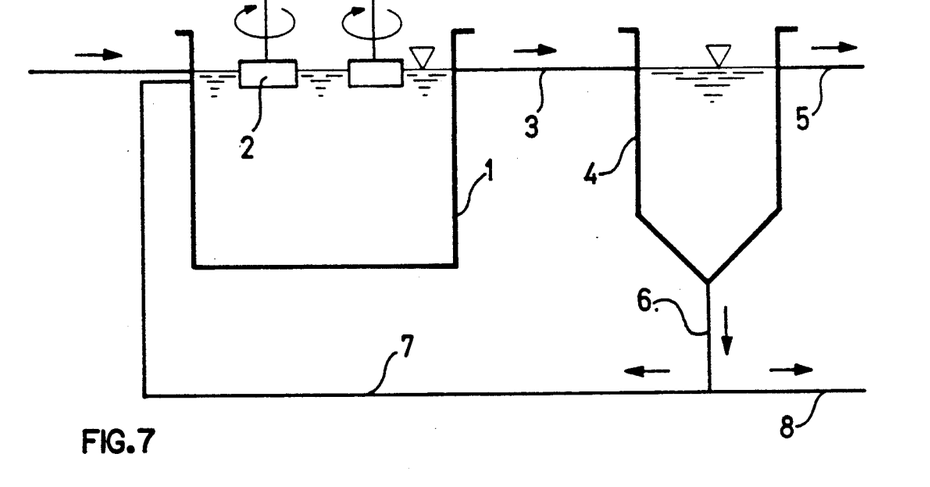
FIG. 7 is a schematic diagram of conventional apparatus for biological purification.
Figure 8:
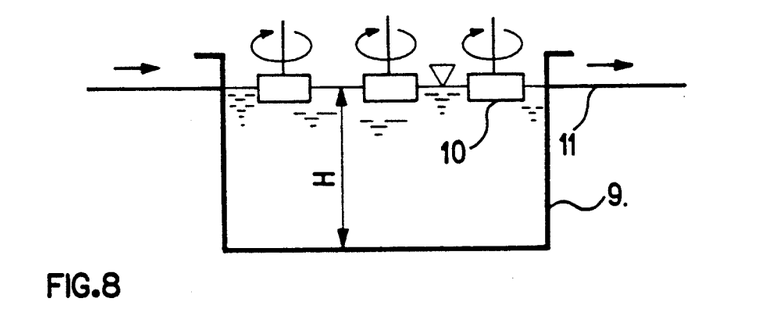
FIGS. 8 and 9 are schematic diagrams of apparatus suitable for carrying out the present invention.
Figure 9:
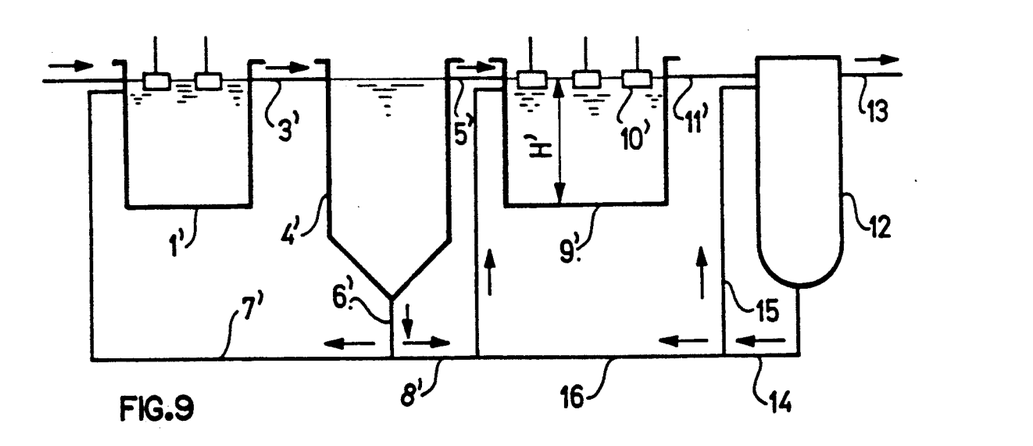

The present invention is described in more detail in the accompanying drawings FIGS. 8 and 9, which represent—in the schematically elevational view—the apparatus for performing the inventive purification in comparison with a conventional apparatus for the biological purification, represented in FIG. 7.

In the conventional apparatus as represented in schematical elevation in FIG. 7, the wastewater is—subsequently to a conventional mechanical and chemical pre-treatment—charged into a biological basin 1, equipped with one or more aerators (stirrers) 2, effecting a substantial mixing of the contents of the basin, whereupon it is supplied via a conduit 3 into a clarifier 4, wherefrom the effluent is discharged through a conduit 5 and the excess sludge through a conduit 6, which excess sludge is either recycled through a conduit 7 into the purification basin 1 or discharged through a conduit 8.

FIG. 8 represents a schematical elevation of the apparatus according to the invention, which comprises a biological basin 10, characterized by a minimum depth corresponding to a distance (H) from the bottom of the basin to the level of the treated wastewater of at least 5 m. Said basin 10 is equipped with one or more surface turbine type aerators 11 of a power of 5.10$^{-2}$-12.10$^{-2}$ kW/m$^3$ of wastewater, which press the activated sludge towards the bottom of the basin 10 and inhibit its rising. The purified sludge-free effluent is discharged through a conduit 11. Since no excess sludge generates, there are not needed any incinerators and corresponding equipment.

FIG. 9 represents a schematical elevation of an apparatus according to the invention, intended for the purification of highly loaded wastewater, resulting e.g. in coking or coal gasification plants. Such wastewater has to be pretreated in a conventional high rate purification system, whose elements correspond e.g. to the embodiment in FIG. 7. The effluent supplied through a conduit 5' and the excess sludge from the recycling flow supplied through a conduit 8' are charged into a reactor corresponding to the embodiment of FIG. 8, wherein the designations H', 9', 10 and 11' correspond to the designations H, 9, 10 and 11 of FIG. 8. The effluent 11' is conducted into a biofilter 12 and the resulting filter residue and the excess sludge are recycled through conduits 14, 15 into the biofilter 12 and through the conduits 14, 16 into the biological basin 9', whereas the filtrate leaves the system through a conduit 13 and represents the final purified effluent product.

It should be noted that the depth of the biological basin is an essential characteristic of the present invention, whereas its cross-section is optional, e.g. round, square, rectangular, elliptical etc.

Hence the design of the basin can be optimized at a minimum volume.

DETAILED DESCRIPTION OF PREFERRED EMBODIMENTS

In accordance with the present invention, the following wastewaters were subjected to biological purification.

EXAMPLE 1

Treatment Of Petrochemical Plant Wastewater

The loading of petrochemical plant wastewater depends on the type of processing but it may be generally divided in the hydroskimming refineries (low-loaded wastewater) and refineries with catalytic units (high-loaded wastewater). Both types of wastewater require a biological purification step after the mechanical and chemical treatment.

A conventional system for the biological treatment of petrochemical wastewater is represented in FIG. 7 and comprises an aerated biological basin, a settling unit, a sludge recirculation unit and a system for the discharge of excess sludge, which is thickened and usually burnt in an incinerator.

The present inventive method of biological purification with no excess sludge only requires an apparatus as represented in FIG. 8, comprising a biological basin of a minimum depth of 5 m and a specific type of aeration, achieved by one or more surface turbine type aerators of $5.10^{-2}$ to $12.10^{-2}$ kW/m$^3$ of the basin and a M/F ratio of 20-100.

In the following Table 10 there are given the characteristics of the influent and the effluent in the biological purification with no excess sludge according to the present invention.

The purification treatment was performed on the wastewater of the petrochemical refinery plant in Rijeka/YU in a biological basin of a depth of 6 m. The height of the level of the liquid charge was 6 m.

The power of the surface turbine type aerators was 0.0675 kW/m$^3$ of wastewater.

The M/F ratio in the biological basin was 25-30. The capacity of the basin was 6000 m$^3$.

TABLE 10

Quality of the influent and effluent in the biological treatment of petrochemical plant wastewater according to the invention

| Characteristic | Influent | Effluent |
|---|---|---|
| pH | 8.5–11.5 | 7.0–7.5 |
| susp. matter | 20–40 mg/l | 5 mg/l |
| COD, BOD, TOC | 600; 450; 250 | 70; 40; 20 |
| phenols | 40–250 mg/l | 0.06–0.08 mg/l |
| sulfides | 40–600 mg/l | 0.05 mg/l |
| mercaptans | 20–200 mg/l | 0.6 mg/l |
| oil | 20–40 mg/l | 2–5 mg/l |
| cyanides | 5–10 mg/l | 0.5 mg/l |

COD = chemical oxygen demand
TOC = total organic carbon

It is evident from the above Table 10 that a high grade effluent is obtained under severe reaction conditions: high pH values (8.5-11.5), phenol shocks (violent fluctuations of 200-250 mg/l) and continuous high sulfide (600 mg/l) and mercaptan (200 mg/l) concentrations in the influent. It is not possible to achieve such a result by means of conventional systems for biological purification. It has also been noted that in case of the so-called "total shock" when all microorganisms were destroyed in the biological basin, the activated sludge was regenerated with 24 hours whereas the conventional systems needed 15-25 days for said regeneration.

EXAMPLE 2

Treat Of Coal Gasification And Coking Wastewater

Coking and coal gasification wastewaters are characterized by a high loading of COD (BOD$_5$ and TOC resp.) values and by high loads of nitrogen compounds. The high COD value results from the presence of phenols, thiocyanates and numerous other organic compounds.

Hitherto coal gasification and coking wastewaters have, in practice, only been purified in two- or three-step biological treatment systems. The resulting excess sludge has been disposed of on the hot coke.

The present inventive method makes possible the purification of an influent defined in the following Table 11 in a purification system in accordance with the scheme in FIG. 9, yielding a high-grade effluent defined in Table 11.

TABLE 11

Quality of the influent and effluent in the biological treatment of coal gasification and coking wastewatera

| Characteristic | Influent | Effluent |
|---|---|---|
| pH | 8.5–9.5 | 7–8.5 |
| COD, BOD, TOC | 3000–5000; 2000–2500; 500–1500 | 70; 40; 20 |
| phenols | 500–1500 mg/l | 0.2 mg/l |
| sulfides | 20–50 mg/l | 0.05 mg/l |
| thiocyanates | 50–150 mg/l | 0.2 mg/l |
| ammonia | 200–500 mg/l | 1.00 mg/l |
| nitrate | 20–50 mg/l | 10 mg/l |
| nitrite | 5–10 mg/l | 1.00 mg/l |
| susp. matter | 5–20 mg/l | 5 mg/l |

Owing to the high ammonia content all effluents resulting from the treatments of coal gasification and coking wastewaters in biological basins comprise high nitrate concentrations. Therefore also the present inventive method suggests an additional denitrification of the effluent delivered from the biological basin in FIG. 9 in the biofilter. The excess sludge from the biofilter is recirculated to the biological basin and is subjected to the conditions of total endogenous respiration.

The purification treatment was performed on the wastewater of a coke plant effluent with a flow rate of 50 m$^3$/h and a residual COD of 800 mg/l, in a biological basin of a depth of 7 m. The height of the liquid charge was 6 m. The power of the surface turbine aerator was 0.09 kW/m$^3$ of wastewater.

The M/F ratio in the biological basin was 40.
The capacity of the basin was 11000 m$^3$.

EXAMPLE 3

Treatment of Domestic Sewage

The influent domestic sewage is predominantly loaded by two parameters, namely by an increased BOD$_5$ value and by suspended matter.

The conventional purification systems comprise pretreatments (mechanical treatments, flocculations, sedimentation, flotation) to remove the suspended matter and various modifications of biological treatments to eliminate the increased BOD$_5$. Although it is a low loaded wastewater, it is abundant and forms a considerable amount of excess sludge when subjected to conventional biological treatments. This excess sludge is conventionally thickened and subjected to an aerobic (rarely) and/or anaerobic (often) treatment, yielding methane, which in turn can be used as an energy source and reduces the operating costs of the system. The digestion step yields the sludge, whose disposal is an ever growing environmental problem. Owing to its heavy metal contents it may often not be allowed to be deposited.

According to the present invention ordinary domestic sewage of conventional composition was subjected to biological purification with no excess sludge in a biological basin and at reaction conditions described in Example 1. It has been ascertained that the obtained effluent has a $BOD_5$ of 20 mg/l and 10 mg/l of suspended matter. Thus it is in conformance with the Regulations on the Quality of Purified Sewage in most countries.

Since the inventive purification does not need any clarification, excess sludge recirculation, (an)aerobic digestion of the excess sludge etc., the investment and operating costs are considerably reduced.

Although the present invention is specifically disclosed in the afore-going embodiments, they should only be construed as an illustration of the invention, not limiting it in any way.

In is evident to anyone skilled in the art that the inventive method and apparatus can be applied in the purification of all types of wastewaters, e.g. of metallurgic, tannery, food processing, and various chemical plants.

What is claimed is:

1. A method for the biological purification of wastewater with no excess activated sludge with comprises charging into a purification basin, wastewater that is mechanically pretreated or chemically pretreated or both and which contains substantially no toxic or inhibiting substances for the microorganisms or both wherein the level of said wastewater is at least 5 m over the bottom of said basin, and said wastewater is under the conditions of total endogenous respiration aerated with one or more surface turbine type aerators of $5.10^{-2}$ to $12.10^{0.2}$ kW/m$^3$ of wastewater, at a microorganism to food ratio of 20 to 100.

2. The method of claim 1, wherein the microorganism to food ratio per height of the biological basin (M/F)/H is within the range of 0.5 to 16.

3. The method of claim 1, wherein the wastewater is high or low loaded oil refining wastewater.

4. The method of claim 1, wherein the wastewater is coal processing wastewater.

5. The method of claim 1, wherein the wastewater is municipal wastewater.

6. The method of claim 1, wherein the discharged effluent has a substantial neutral pH value.

7. The method of claim 1, wherein the effluent has a biological oxygen demand ($BOD_5$) of maximum 20 mg/l.

8. The method of claim 1, wherein the discharged effluent has a content of suspended matter of maximum 40 mg/l.

9. The method of claim 1, wherein the discharged effluent has a nitrate content of maximum 1 mg/l.

10. The method of claim 1, wherein the discharged effluent has an ammonia content of maximum 1 mg/l.

11. The method of claim 1, wherein the effluent is disposed of directly, subsequently to the discharge from the basin, without any additional processing.

* * * * *